A. R. Buffington,
Mechanical Movement.

N° 84,678. Patented Dec. 8, 1868.

Witnesses;
Frank K. Phipps
John Applin

Inventor;
A. R. Buffington

A. R. BUFFINGTON, OF UNITED STATES ARMY.

Letters Patent No. 84,678, dated December 8, 1868.

MECHANICAL MOVEMENT.

The Schedule referred to in these Letters Patent and making part of the same.

*To all whom it may concern:*

Be it known that I, A. R. BUFFINGTON, captain of ordnance, and brevet major, United States Army, have invented a new and useful Improved Mechanical Movement for use in and with machinery and engines, viz, a mechanical movement for the transmission of motion, so as to obtain a variable power with uniform velocity, the velocity being increased to twice or reduced to one-half, accordingly as the initial power is applied to one or the other of the two parts necessary to produce the movement; and I do hereby declare that the following is a full, clear, and exact description of the construction and operation of the same, reference being had to the annexed drawings, making a part of this specification, in which—

Figure 1:
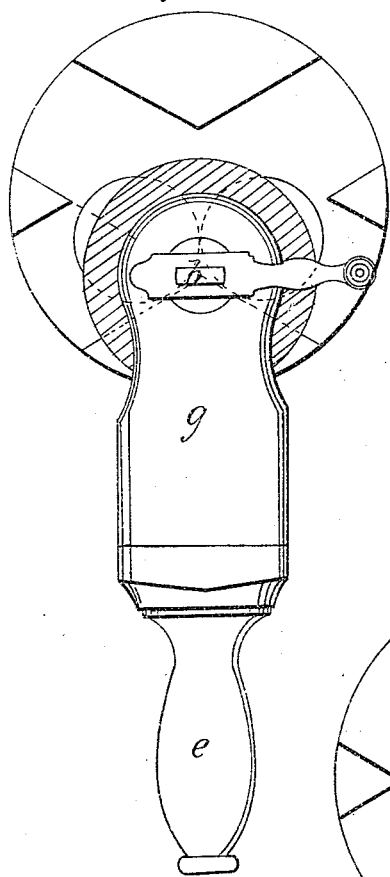
Figure 2:
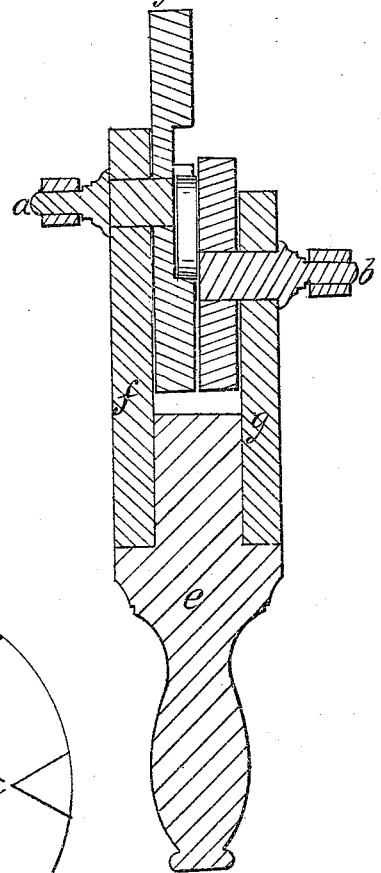

Figure 1 is a side elevation,

Figure 2, a longitudinal section, and

Figures 3, 4, 5, and 6, plane views of the principal parts.

The construction and operation are as follows:

In the application, though unvarying in principle, the construction will vary in the distances between the centres or axes of motion of the two parts above referred to, in the length, width, and depth of the grooves, (or dimensions of corresponding parts of other contrivance, hereinafter referred to,) in the angle (if required or desired) at which these grooves or surfaces, performing the same office, intersect, and in the dimensions of the parts that move in or between these grooves or surfaces, thus varying, according to the nature of the application, the forms and dimensions of the parts to which it is applied, and the strength required by the work to be performed.

Referring to annexed drawings, the essential parts (figs. 3, 4, 5, and 6,) are—

Figure 3:
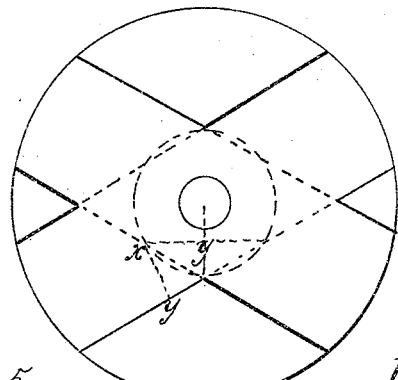

Fig. 3, a wheel or circular limb, fastened to the end of a shaft or arbor, (seen at $a$, fig. 2,) having two grooves in one face, as shown in the figure, intersecting at the centre, at an angle of sixty or one hundred and twenty degrees, according as it is read to the right or left.

Figure 4:
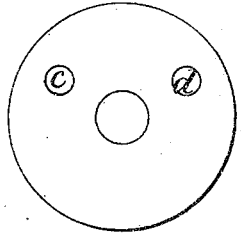

Fig. 4, a smaller wheel or limb, fastened to an arbor or shaft, (seen at $b$, fig. 2,) with two axles or pins, $c\ d$, projecting, as shown, from one face, the points of the axes of these pins, in the face of the wheel, being at a distance from the centre, equal to the distance between the axes of the shafts or arbors $a\ b$, fig. 2; and lines connecting said points with the centre of the face of the limb, intersect there at an angle of one hundred and twenty degrees.

Figure 5:
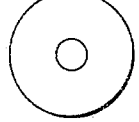
Figure 6:
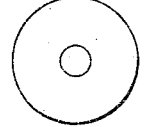

Figs. 5 and 6, two small equal wheels, whose radius is sufficiently less than half the distance between the centres of the pins $c\ d$, fig. 4, to enable them to revolve on these pins without touching each other; and the frame or support for these parts, shown in figs. 1 and 2, E being the handle, and $f$ and $g$ two branches, within which the limbs and wheels above described are placed, as shown in the figures.

These several parts, assembled, are shown in figs. 1 and 2, the small wheels being supported in the grooves of the larger limb on the pins or axles of the smaller.

Now, if power be applied to the shaft ($a$, fig. 2,) of the (larger) limb with the grooves, and it be made to revolve, the grooves bearing on the small wheels will cause the (smaller) limb supporting them to revolve with twice the rapidity, a uniform motion and variable power.

If power be similarly applied to the smaller limb, and it be made to revolve, the small wheels working in the grooves of the other (larger) limb, will cause it to revolve with half the rapidity, a uniform motion, and variable power. The variation in power arises thus: The small wheels move in and along the grooves of the larger limb, passing and repassing the centre of it, thereby constantly varying the leverage with which the limbs act upon each other, whether the power which produces the motion be applied to one or the other of them.

The principle that secures the increased or decreased velocity and uniformity—uniformity in contradistinction to what is called "loss-and-gain" motion—is a mathematical law, viz, the angle subtended by any chord of a circle is equal to twice the angle made by the chord and a tangent to the circle at either of the chord's extremities.

The application of this law may be readily seen by conceiving a tangent-line to any point of a circle, revolving about that point as a centre. At any time of the revolution, that part of it within the circle—that is, a chord of the circle—will subtend, at the circle's centre, an angle equal to twice the angle that the tangent-line makes with its original position.

Now, if the point of tangency be conceived to move along the tangent in its revolution, at the same time revolving the circle around its centre, the circle shall have revolved through three hundred and sixty degrees, when the tangent accomplishes one hundred and eighty only.

The dotted lines, fig. 3, show the construction of the grooves, the line $x\ y$ being the limit for the radius of the equal wheels, figs. 5 and 6. It may be less, (the grooves would then be narrowed,) but cannot be greater (for the given distance between the shafts $a\ b$, fig. 2.)

The larger limb (fig. 3,) must be at least twice the diameter of the smaller; that is, the grooves must be, in length, at least twice the distance between the axes of the shafts $a$ and $b$, fig. 2, which latter distance must equal the distance of the centres of the small wheels from the centre of the (smaller) limb, on the face of which they are supported by the pins $c\ d$, fig. 4.

Any face or surface of any body, permitting revolution about an axis, and the construction of grooves, as above described, or any contrivance performing the office of these grooves, that is, possessing surfaces bearing the relations to each other that the sides of these grooves bear to each other, can be so connected with another body, capable of revolution about an axis, and permitting the construction of the pins on axles and wheels, or sliding blocks, (as hereinbefore and after described,) as to transmit motion, as above set forth, it only being necessary that the grooves or other contrivance in one body, intersect at its axis of revolution at any practical angle, say from thirty degrees upward, (meaning the smaller angle of the two made by the intersection,) and that the line connecting the centres of the pins subtend, at the centre of the limb to which they belong, an angle equal to twice this (smaller) angle of intersection, the width of the grooves, or distance between corresponding surfaces, not being limited in diminution, except by the diameter of the pins, hubs, projections, blocks, or wheels, moving in or between these surfaces, and, in extension, by the dimensions of the parts to which the movement is applied.

Blocks instead of wheels, to slide along the surfaces, may be used, or the pins or axles without either blocks or wheels. Therefore,

What I claim as my invention, and desire to secure by Letters Patent, is—

The improved mechanical movement, consisting of devices herein described, by means of which angular motion may be transmitted from one body to another, increased in velocity to twice, or reduced to one-half, the power varying, but the motion uniform, according as the one from which the initial motion proceeds acts upon the other, by means of surfaces on which slide or roll parts connected with this other body, or through the intervention of projections, axles, hubs, or pins simply, or these with blocks or wheels fitted on them, sliding, rolling, or moving in contact with surfaces of said other body, as substantially herein described.

A. R. BUFFINGTON.

Witnesses:
FRANK H. PHIPPS,
JOHN APPLIN.